(12) United States Patent
Joedicke

(10) Patent No.: US 10,655,021 B2
(45) Date of Patent: May 19, 2020

(54) METHOD OF FABRICATING A LOADED POWDER, AND A PRODUCT MADE OF ELECTRICALLY CONDUCTIVE COMPOSITE MATERIALS

(71) Applicant: AIRBUS HELICOPTERS, Marignane (FR)

(72) Inventor: Philippe Joedicke, La Fare les Oliviers (FR)

(73) Assignee: AIRBUS HELICOPTERS, Marignane (FR)

( * ) Notice: Subject to any disclaimer, the term of this patent is extended or adjusted under 35 U.S.C. 154(b) by 39 days.

(21) Appl. No.: 15/957,185

(22) Filed: Apr. 19, 2018

(65) Prior Publication Data

US 2018/0305564 A1 Oct. 25, 2018

(30) Foreign Application Priority Data

Apr. 20, 2017 (FR) ..................................... 17 70403

(51) Int. Cl.
*C09D 5/24* (2006.01)
*B01J 2/16* (2006.01)
(Continued)

(52) U.S. Cl.
CPC ................ *C09D 5/24* (2013.01); *B01J 2/003* (2013.01); *B01J 2/16* (2013.01); *C08J 3/126* (2013.01); *C09D 5/03* (2013.01); *C09D 201/00* (2013.01); *H01B 1/22* (2013.01); *H01B 3/004* (2013.01); *H01B 3/34* (2013.01); *C08J 2300/22* (2013.01); *C08J 2361/04* (2013.01); *C08J 2371/00* (2013.01); *C08J 2379/08* (2013.01);
(Continued)

(58) Field of Classification Search
CPC . B01J 2/003; B01J 2/16; C08J 2300/22; C08J 2361/04; C08J 2371/00; C08J 2379/08; C08J 2381/02; C08J 2381/04; C08J 2401/02; C08J 2401/28; C08J 2491/06; C08J 3/126; C09D 201/00; C09D 5/03; C09D 5/24; H01B 1/22; H01B 3/004; H01B 3/34
See application file for complete search history.

(56) References Cited

U.S. PATENT DOCUMENTS 3,856,699 A 12/1974 Miyano et al.
5,709,740 A 1/1998 Haider et al.
(Continued)

FOREIGN PATENT DOCUMENTS

FR 2995222 A1 3/2014

OTHER PUBLICATIONS

French Search Report for French Application No. FR1770403, Completed by the French Patent Office, dated Dec. 6, 2017, 7 pages.
(Continued)

*Primary Examiner* — Alexander M Weddle
(74) *Attorney, Agent, or Firm* — Brooks Kushman P.C.

(57) ABSTRACT

A method of fabricating an electrically conductive loaded powder of thermoplastic polymers. The method comprises the steps of making an original powder containing cores made of thermoplastic polymers and of making the loaded powder by using electrically conductive submicrometer filaments and wax, forming a plurality of particulate compounds each comprising one of the cores together with at least one of the filaments and a protective membrane of the wax.

20 Claims, 2 Drawing Sheets

(51) Int. Cl.
  *B01J 2/00* (2006.01)
  *C08J 3/12* (2006.01)
  *C09D 5/03* (2006.01)
  *H01B 3/00* (2006.01)
  *H01B 1/22* (2006.01)
  *H01B 3/34* (2006.01)
  *C09D 201/00* (2006.01)

(52) U.S. Cl.
  CPC ........ *C08J 2381/02* (2013.01); *C08J 2381/04* (2013.01); *C08J 2401/02* (2013.01); *C08J 2401/28* (2013.01); *C08J 2491/06* (2013.01)

(56) References Cited

U.S. PATENT DOCUMENTS

| | | |
|---|---|---|
| 6,911,169 B2 | 6/2005 | Kwag et al. |
| 7,432,448 B2 | 10/2008 | Aisenbrey |

OTHER PUBLICATIONS

Stephane Gillet et al., Contribution a l'amelioration des proprietes de conduction electrique et d'efficacite de blindage electromagnetique pour un materiau composite, Journal—Journe d'etude Societe Francaise de Thermique, http://www.sft.asso.fr/Local/sft/dir/user-3775/documents/actes/journeessft/JSFT_08_01_2015/Gillet et al.pdf, Jan. 8, 2015, 23 pages.

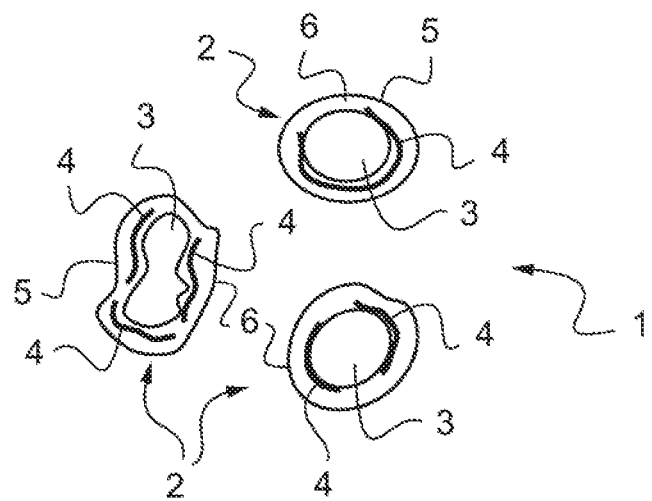
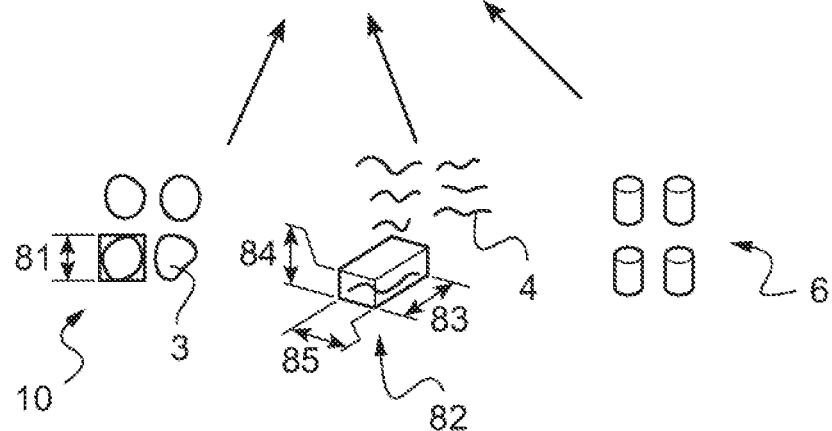
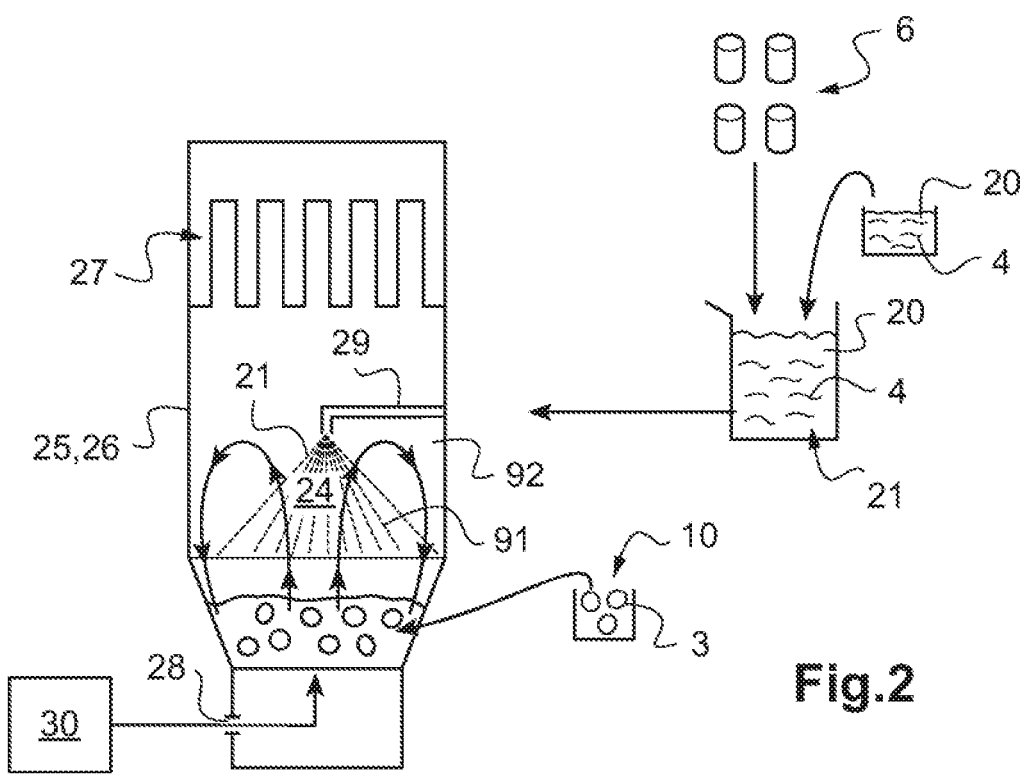
Fig.1
Fig.2

METHOD OF FABRICATING A LOADED POWDER, AND A PRODUCT MADE OF ELECTRICALLY CONDUCTIVE COMPOSITE MATERIALS

CROSS-REFERENCE TO RELATED APPLICATIONS

This application claims priority to French patent application No. FR 1770403 filed on Apr. 20, 2017, the disclosure of which is incorporated in its entirety by reference herein.

BACKGROUND OF THE INVENTION

(1) Field of the Invention

The present invention relates to a method of fabricating a loaded powder, and to a product made of electrically conductive composite materials.

2) Description of Related Art

The term "product" as used herein designates a finished product as such, or indeed a semi-finished product suitable for use elsewhere. Thus, by way of example, the product may be in the form of a semi-finished product forming a plate of composite materials, the plate subsequently being cut up in order to fabricate some particular part, for example.

A product made of composite materials comprises at least reinforcement embedded in a matrix. The term "reinforcement" covers a material of mechanical strength that is considerably greater than the mechanical strength of the matrix.

For example, reinforcement may be in the form of carbon, glass, aramid, . . . fibers. Furthermore, these fibers may be used in particular in the form of a woven fabric, of a sheet, or indeed of unidirectional yarns.

By way of example, the matrix may be in the form of resin matrices that are not electrically conductive.

A product made of composite materials based on resins can be fabricated using various techniques.

In an impregnation technique known as the "film" technique, the resin is injected into an extruder so as to be transformed into a film of small thickness. The resin film is adjacent to reinforcement. The reinforcement is bonded to the resin film by being heated and pressed against the resin film by a press or a platen, for example.

In an impregnation technique known as the "dry" technique, the resin is in the form of a powder. This resin in powder form is spread by dusting in free air onto the reinforcement that is to be impregnated. The reinforcement and powder combination is then heated so that the resin melts in order to adhere to the reinforcement.

In an impregnation technique known as the "wet" technique, the resin is in the form of a powder immersed in a liquid. The reinforcement is passed through said liquid so that the powder becomes deposited on the reinforcement. The reinforcement and powder combination is then heated so that the resin melts in order to bond to the reinforcement.

By way of example, those techniques make it possible to obtain resin-impregnated reinforcing plates. A laminate made of composite materials can then be obtained by stacking such plates on one another and compacting the stack.

Nevertheless, that laminate of composite materials is not electrically conductive, or presents poor capacity for conducting electric current.

In order to make panels that are electrically conductive, e.g. for walls of an aircraft, wire meshes may be incorporated in the laminate made of composite materials.

Alternatively, metal foil may be fastened to a laminate made of composite materials.

Document U.S. Pat. No. 6,911,169 describes a composite product having carbon fibers.

The document to be found at the following Internet address: http://www.sft.asso.fr/Local/sft/dir/user-3775/documents/actes/jour neessft/JSFT_08_01_2015/Gillet et al.pdf mentions the use of a thermosetting resin loaded with carbon nanotubes.

Carbon black nanoparticles are thus dispersed in a resin by a stirrer in order to make a loaded resin. The mixture of resin with nanoparticles of carbon black then impregnates reinforcement by an infusion method or by a resin transfer molding (RTM) method.

Using nanoparticles must nevertheless be envisaged with prudence, given the known environmental health and hygiene (EHH) provisions.

Furthermore, the stirrer runs the risk of breaking the nanoparticles.

Document FR 2 995 222 does not belong to the technical field of the invention since it relates to fabricating a dispersion of microcapsules of an active principle.

Document U.S. Pat. No. 3,856,699 describes a method of producing a capsule having walls made of wax.

Document U.S. Pat. Nos. 7,432,448 and 5,709,740 are also known.

BRIEF SUMMARY OF THE INVENTION

An object of the present invention is thus to propose a method of fabricating an electrically conductive powder of thermoplastic polymers suitable for obtaining a powder made of electrically conductive composite materials.

The invention thus provides a method of fabricating an electrically conductive powder of thermoplastic polymers, the electrically conductive powder of thermoplastic polymers being referred to as a "loaded" powder. The method comprises the following steps:

making an original powder containing cores of thermoplastic polymers, each of said cores comprising a grain or a flake; and making said loaded powder using the original powder together with electrically conductive "submicrometer" filaments and wax so as to form a plurality of particulate compounds, a smallest dimension of each submicrometer filament being greater than or equal to one hundred nanometers, each particulate compound comprising one of said cores together with at least one said electrically conductive submicrometer filament and a protective membrane of said wax, at least one of said filaments and one of said protective membranes being arranged around one of said cores in a particulate compound.

This method makes it possible to obtain a loaded powder. The loaded powder comprises particulate compounds in the form of grains or flakes with filaments and a protective membrane arranged or adsorbed thereon. Under such circumstances, at least one filament and a protective membrane are arranged around the periphery of a grain or a flake. Each filament of one of the particulate compounds may be arranged at least in part between the periphery of a grain or of a flake and the protective membrane of the particulate compound, and/or may be arranged at least in part in the protective membrane of the particulate compound and/or may be bonded at least in part to the protective membrane of the particulate compound.

Each protective membrane thus tends to hold each filament of a particulate compound securely to the particulate compound. A particulate compound core made of thermoplastic polymers is loaded with one or more submicrometer filaments and a protective membrane, the protective membrane serving to keep the filament(s) of the particulate compound in contact on the core of the particulate compound.

The loaded powder then comprises cores made of thermoplastic polymers loaded with functional elements in the form of filaments that can impart a function to the particulate compound comprising a core and filament(s) and a protective membrane other than a function of the core on its own. In particular, and in the context of fabricating a product out of composite materials, the core may be used as a matrix of the product made of composite materials and the filaments may impart good electrical conductivity to the product.

Furthermore, the protective membrane may tend to limit the impact of the loaded powder in terms of its EHH impact. Specifically, the protective membrane tends to keep the filaments secured on the cores, and therefore tends to limit any risk of filaments escaping into the atmosphere. Under such circumstances, the loaded powder may tend to reduce environmental risks for an operator while impregnating reinforcement, possibly reducing the potential presence of submicrometer particulates in the air.

Furthermore, the filaments are of submicrometer size but not of nanometer size, which implies that the loaded powder can be manipulated in an environment that does not require the application of standards reserved for nanometer-sized elements.

Under such circumstances, the loaded powder can be used in the matrix when fabricating a product out of composite materials. In particular, it is possible to envisage performing impregnation by a dry technique or by a wet technique.

When using the wet technique, the protective membrane and the size of the filaments tends to reduce the impact of the powder on the work environment of the operator. The protective membrane of a particulate compound serves to limit risks of the filament(s) separating from the core of the particulate compound, in particular while handling the loaded powder during transfer, dusting, operations. EHH risks due to the presence of filaments in the air are thus reduced.

With the wet technique, the powder is dispersed in a bath through which the reinforcement travels. The protective membrane tends to limit any risk of the filament(s) separating from the core of each particulate compound in the bath so that the core and filaments and protective membrane of each particulate compound are transferred onto the reinforcement at the outlet from the bath.

The method also makes it possible to obtain a loaded powder directly. By way of example, the method does not lead to an extruded product that needs to be "micronized" in order to obtain a powder. Such "micronizing" can be damaging for the fillers and can diminish their performance.

The method may also include one or more of the following characteristics, singly or in combination.

Thus, each filament may be inscribed in a rectangular parallelepiped having a length lying in the range 50 micrometers (μm) to 200 μm, a height lying in the range 100 nanometers (nm) to 400 nm, and a width lying in the range 100 nm to 400 nm.

The filaments are thus submicrometer elements and not nanometer elements. Specifically, a submicrometer element is an element for which the smallest dimension is less than one micrometer and greater than or equal to one hundred nanometers, whereas a nanometer element is an element for which the smallest dimension lies in the range 1 nm to 100 nm.

Under such circumstances, the strict standards that apply to nanometer elements do not apply to these filaments.

In an aspect, each of the cores may be inscribed in a cube presenting sides each extending over a length lying in the range 20 μm to 100 μm.

Under such circumstances, the cores are submicrometer elements and not nanometer elements. The strict standards that apply to nanometer elements do not apply to these cores.

In an aspect, the cores of thermoplastic polymers may belong to a family selected from: polyaryletherketone (PAEK); poly(phenylene sulfide) (PPS); polyetherimide (PEI); or polyimide (PI).

The cores may thus be based on high performance thermoplastic polymers. Such polymers present high performance both chemically and mechanically, giving them very good ability to withstand various chemical agents. Working such polymers is then difficult, since those polymers are difficult to dissolve. Nevertheless, the variants explained below enable a loaded powder to be obtained that is based on grains or flakes of polyaryletherketone (PAEK) and/or poly(phenylene sulfide) (PPS) and/or polyetherimide (PEI) and/or polyimide (PI) polymers.

Cores made of thermoplastic polymers having high chemical performance also present the advantage of providing good impregnation of reinforcing fibers while fabricating a product out of composite materials with the loaded powder.

This method thus makes it possible to obtain a loaded powder having cores that are suitable for thoroughly impregnating the reinforcement of a product made of composite materials.

In an aspect, the filament(s) may be made of silver.

The use of silver filaments can be advantageous. Specifically, silver filaments can tend to spread naturally around the core of a particulate compound, in or under the wax protective membrane of the particulate compound.

Optionally, the submicrometer filaments may be made of copper, of a material based on graphene, or of carbon.

In an aspect, the wax may be ethyl cellulose.

The use of an ethyl cellulose type wax is advantageous, in particular since it is compatible with solvents of the water or ethanol type.

Optionally, the wax may comprise amylose, amylose with lipophilic derivatives, epoxy, . . . .

In an aspect, these particulate compounds may have a mean percentage by weight of filaments relative to the weight of the cores lying in the range 10% to 30%, and for example about 20%.

The term "mean percentage by weight of filaments relative to the weight of the cores lying in the range 10% to 30%" means that on average the particulate compounds of loaded powder present that percentage. Such a particulate compound tends to present advantageous electrical conductivity.

In an implementation, said particulate compounds are formed by:

fabricating an intermediate solution, said intermediate solution comprising a solution of a solvent and of said wax in which at least said filaments are dispersed; and spraying said intermediate solution into a reactor.

The loaded powder is then recovered from the reactor.

By way of example, the wax is mixed in the solvent in which the submicrometer filaments are dispersed. At the end of the mixing step, the method makes it possible to obtain a solution of the solvent and of the wax in which at least the filaments are dispersed, with this solution being referred to for convenience as an "intermediate" solution.

The solvent is selected so as to enable the wax to be mixed in without degrading the filaments.

The intermediate solution is then sprayed into a reactor in order to cause the solvent to disappear, so as to place or even adsorb the filaments on the cores made of thermoplastic polymers and so as to put the protective membranes of the particulate compounds into place.

The loaded powder is then obtained using a "dry" technique, which means that the loaded powder leaving the reactor directly ready for handling.

Optionally, the method makes provision not to stir the solvent and its content strongly in order to avoid breaking the filaments so as to avoid reducing the final electrical conductivity of the product and/or so as to avoid increasing EHH risks. It is possible to envisage slow mechanical stirring.

Optionally, the filaments may be dispersed in the intermediate solution by using an ultrasound probe.

In a first variant of this implementation, said reactor may be an air-fluidized bed reactor, and the method may include a step of fluidizing the original powder in the air-fluidized bed reactor, said spraying being performed by spraying said intermediate solution onto said original powder.

In this first variant implementation, the original powder containing the cores made of thermoplastic polymers may be introduced into an air-fluidized bed reactor. An air-fluidized bed is then projected into the reactor in order to put the cores of thermoplastic polymers into suspension in a chamber of the reactor. Under such circumstances, the intermediate solution is sprayed into the reactor onto the original powder in order to form the loaded powder.

The air-fluidized bed may be sprayed at a temperature higher than the evaporation temperature of the solvent, e.g. lying in the range 60 degrees Celsius (° C.) to 120° C.

In the air-fluidized bed reactor, the solvent evaporates, with the wax becoming secured in particular onto the cores while also carrying the filaments.

At the end of this step, the loaded powder can be recovered.

The solvent may comprise ethanol.

In an example that has been tested successfully, the solvent was ethanol, the wax being ethyl cellulose, and the temperature of the air-fluidized bed being higher than 78° C.

In a second variant implementation, said reactor may be an atomizer, the intermediate solution may include said original powder, and said spraying may be performed in said atomizer using a fluid presenting a predetermined temperature higher than an evaporation temperature of said solvent.

In the second variant, the original powder containing the cores made of thermoplastic polymers is also dispersed in the solvent and thus in the intermediate solution.

Under such circumstances, the intermediate solution containing the solvent, the filaments, the wax, and the cores made of thermoplastic polymers is introduced into an atomizer.

The solvent then evaporates so as to give rise to the loaded powder.

The solvent may optionally be water.

In an example that has been tested successfully, the wax was ethyl cellulose, which wax was mixed in a solvent of water type that contains the filaments and the cores made of thermoplastic polymers.

In an aspect, said predetermined temperature is higher than a glass transition temperature of the wax.

In this example, the temperature of the hot air is higher than the glass transition temperature of the wax in order to optimize the protective membrane.

It is also possible to envisage a temperature of the hot air that is lower than the glass transition temperature of the wax.

Furthermore, the present invention also provides a method making it possible to obtain an electrically conductive product made of composite materials using a loaded powder.

The invention thus provides a fabrication method for fabricating a product made of composite materials, the product being electrically conductive. The method comprises the steps of:

depositing a loaded powder on reinforcement using a dry technique or a wet technique, making use of said loaded powder obtained by applying the above-described method; and passing said reinforcement and said loaded powder through an oven, which oven applies a predetermined heating cycle.

The use of functional fillers that are complex because of their shapes and their sizes can make it difficult to obtain an electrically conductive product, e.g. because of a risk of aggregates forming or of shearing filaments in the loaded powder, or indeed of poor dispersion.

With this method, the loaded powder is immediately suitable for use in the context of an impregnation procedure using a dry technique or a wet technique. The dry technique requires the loaded powder to be dusted, which does little damage to the loaded powder. Likewise, the wet technique consists in dispersing the loaded powder in a bath, e.g. using ultrasound in order to avoid damaging the filaments.

At the end of placing the loaded powder on the reinforcement, the reinforcement covered in the loaded powder passes through an oven. The protective membranes are eliminated by melting or subliming. The cores made of thermoplastic polymers and forming at least part of the matrix of the product then become attached to the reinforcement, together with the filaments.

Optionally, the wax may possibly evaporate. If evaporation is used, the method may present a step of sucking out vapor. The wax may be selected to present a degradation temperature that is as low as possible, and optionally lower than 330° C.

Alternatively, the wax may also form part of the matrix, and may indeed provide additional properties to the product.

The heating cycle may comprise:

a first stage of temperature rising at a gradient of 50° C. per minute (° C./min) up to a maximum temperature of 330° C.; and a second stage of maintaining said maximum temperature for a duration lying in the range 15 minute (min) to 30 min.

BRIEF DESCRIPTION OF THE DRAWINGS

The invention and its advantages appear in greater detail from the context of the following description of examples given by way of illustration and with reference to the accompanying figures, in which:

FIG. 1 is a view showing a method of obtaining particulate compounds made of a core, filaments, and a protective membrane;

FIGS. 2 and 3 are views showing the method of fabricating a loaded powder.

Figure 3:
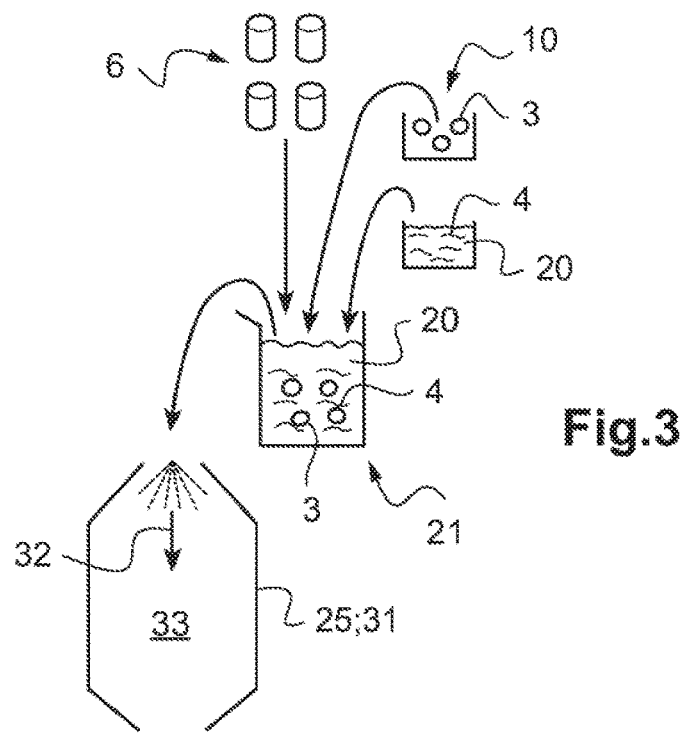

Elements present in more than one of the figures are given the same references in each of them.

DETAILED DESCRIPTION OF THE INVENTION

FIG. 1 shows a method of obtaining a loaded powder 1 suitable for being used by a method of fabricating an electrically conductive product out of composite materials.

The method thus includes a step of making a powder, which powder is referred to as the "original" powder 10 for convenience in order to distinguish it from the other powders used.

The original powder 10 is a powder suitable for being used as a matrix in a product made of composite materials. The original powder 10 has cores 3 made of thermoplastic polymers, where the term "core" covers equally well a grain or a flake. The original powder may thus comprise grains and/or flakes. Such an original powder 10 may be made by a conventional powder fabrication method.

These cores 3 made of thermoplastic polymers may be made using a material belonging to one of the following families: polyaryletherketone (PAEK); poly(phenylene sulfide) (PPS); polyetherimide (PEI); or polyimide (PI).

Furthermore, each core 3 may be inscribed within a cube. By way of example, each side of the cube may have a length 81 lying in the range 20 µm to 100 µm.

In the method, the loaded powder 1 is obtained by combining the original powder 10 with filaments 4 and wax 6.

The filaments 4 are made from a material that is electrically conductive, e.g. silver. Furthermore, the filaments 4 are of submicrometer size. In particular, each filament 4 may be inscribed in a rectangular parallelepiped 82 that presents a length 83 lying in the range 50 µm to 200 µm, a height 84 lying in the range 100 nm to 400 nm, and a width 85 lying in the range 100 nm to 400 nm.

Furthermore, the wax may be ethyl cellulose, for example.

Under such circumstances, the loaded powder 1 that is obtained contains a majority of particulate compounds 2. Each particulate compound 2 comprises a single core 3, at least one filament 4, and a protective membrane 5 made of wax 6, which are bonded together. For example, and for one particulate compound 2, at least one filament 4 is placed or absorbed on the core 3 of the particulate compound, with the protective membrane 5 forming a capsule in which each filament 4 and the core 3 are to be found. For another type of particulate compound at least one filament 4 may be embedded at least in part in the protective membrane 5, or may be adhesively bonded onto the protective membrane 5.

In order to optimize the electrically conductive nature of the loaded powder, the particulate compounds may comprise 10% to 30% by weight on average of filaments 4 relative to the weight of the cores 3.

FIGS. 2 and 3 show several variants of an implementation for obtaining a loaded powder.

In this implementation, the wax 6 is placed in a solvent in order to obtain an intermediate solution 21 in which the filaments 4 are dispersed. By way of example, the filaments are dispersed by an ultrasound probe.

In a first alternative, the filaments 4 are dispersed in the solvent 20, and then the wax is mixed in the filament/solvent mixture.

In a second alternative, the wax is mixed in the solvent and then the filaments are dispersed in the resulting solution.

Whatever the alternative, the intermediate solution 21 containing at least the wax mixed in the solvent together with the dispersed filaments is sprayed into a reactor 25.

In a first variant shown in FIG. 2, the intermediate solution 21 contains only the wax mixed in the solvent together with the dispersed filaments. The intermediate solution is sprayed into a reactor 25. The reactor 25 has an air-fluidized bed 30. Such an air-fluidized bed reactor 26 contains an enclosure defining a chamber 24. Furthermore, the air-fluidized bed reactor 26 has an air inlet 28 for injecting an air-fluidized bed 30 into the chamber 24. This air then passes through a filter 27 before being expelled out from the reactor.

Furthermore, the air-fluidized bed reactor 26 has a spray nozzle 29.

Under such circumstances, the original powder 10 is inserted into the chamber 24. The original powder 10 is then fluidized by the air-fluidized bed 30.

Fluidizing the original powder has the effect of placing a column of cores in an upward flow of air so as to obtain a suspension without significant movement of the cores 3. Such a suspension is obtained as a result of a differential pressure difference between the base and the top of the column.

The original powder is thus put into suspension in the chamber 24.

The intermediate solution 21 is then sprayed into the air-fluidized bed reactor 26 onto the original powder.

The intermediate solution 21 constitutes a coating mixture that is sprayed onto the cores. The coating mixture is in the form of droplets having wax, filaments, and the first solvent. The droplets come into contact with the surfaces of the cores in order to become deposited thereon.

In the air-fluidized bed, the cores covered in droplets of coating mixture move, leave the spray zone 91, and enter an expansion zone 92. This results in a flow of the cores that gives rise to drying and thus to evaporation of the solvent. These steps are repeated several times, with the cores making successive passes through the spray zone 91 and the expansion zone 92 where drying takes place. These successive passes tend towards obtaining a continuous and uniform coating of the filaments and the wax on the cores.

This first variant tends to enable cores 3 in suspension in the chamber 24 to be coated continuously with a coating comprising the wax and the silver filaments in a solvent.

This first variant has been tested successfully using an ethyl cellulose wax with silver filaments in a hydroalcoholic solution on cores made of polyetherketoneketone (PEKK). The solvent included ethanol.

The method was performed for a period of less than 10 min with a bed of hot air and it enabled 450 grams (g) of loaded powder to be obtained. Observation using an optical microscope served to verify the presence of cores carrying silver filaments, and a small number of isolated silver filaments. The mean percentage by weight of filaments 4 relative to the weight of the cores 3 was about 22%.

The loaded powder was then used to form testpieces made of composite materials having advantageous electrical conductivity, of the order of 10 siemens per meter (S/m).

In the second variant of FIG. 3, the reactor 25 is an atomizer 31. Such an atomizer 31 comprises an enclosure defining a chamber 33. Furthermore, the atomizer 31 presents a spray system for spraying a mixture into the chamber 33 together with hot air as shown with the arrow 32.

The step of fabricating the intermediate solution includes a step of dispersing the filaments, a step of dispersing the original powder, and a step of mixing the wax in the solvent.

The filaments and the original powder may be dispersed simultaneously.

For example, in a first method, the filaments 4 and the original powder are dispersed in the solvent 20, and then the wax is placed in the solvent-and-filament mixture.

In a second method, the wax is placed in the solvent and then the filaments and the original powders are dispersed in the resulting solution.

Other methods can be envisaged, it being possible for the filaments and the original powder to be dispersed separately.

The intermediate solution is then sprayed by the atomizer using a fluid that presents a predetermined temperature higher than an evaporation temperature of the solvent 20, and possibly higher than a glass transition temperature of the wax.

As a result of the solvent evaporating, this second variant enables the cores and the filaments to be encapsulated by a wax type encapsulating agent during hot spraying. The spraying gives rise to drops being formed that transform into dry particulate compounds.

This second variant has been successfully tested using an ethyl cellulose wax, silver filaments, and water as the solvent.

The process was performed for a period of less than 10 min with hot air at a temperature lower than the glass transition temperature of the wax, and it enabled 50 g of loaded powder to be obtained. Observation by optical microscope served to verify the presence of cores carrying silver filaments.

The loaded powder was then used for forming testpieces made of composite materials having advantageous electric conductivity.

The process was also performed while adding a plasticizing agent in order to lower the glass transition temperature of the wax during a period of less than 10 min with hot air at a temperature higher than this modified glass transition temperature of the wax, and it enabled 50 g of loaded powder to be obtained. Observation with an optical microscope served to verify the presence of cores carrying silver filaments.

The loaded powder was then used for making testpieces out of composite materials having advantageous electrical conductivity.

In another aspect, a method of fabricating a product out of composite materials can make use of the loaded powder.

Figure 4:
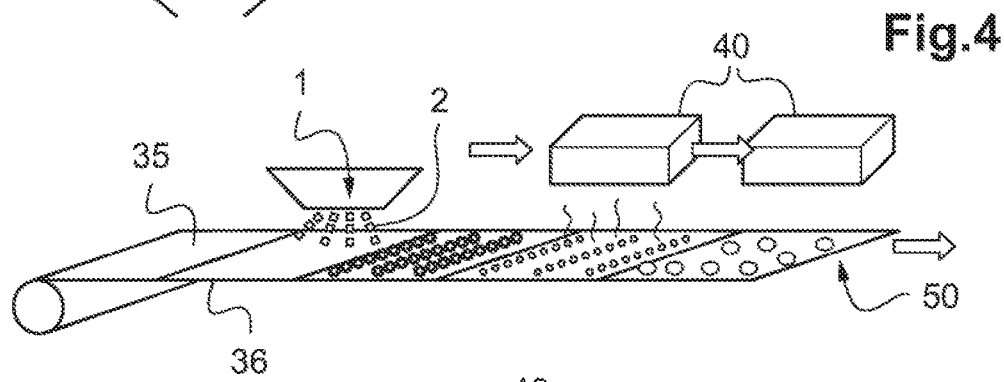
FIGS. 4 to 6 are views showing the method of fabricating a product out of electrically conductive composite materials with a loaded powder.
Figure 5:
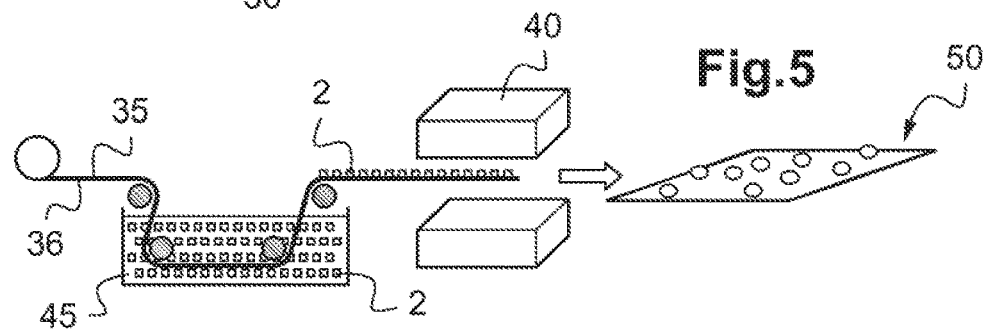

With reference to FIGS. 4 and 5, the loaded powder 1 is used by being deposited on reinforcement 35. By way of example, the reinforcement 35 comprises fibers arranged on a strip 36.

In a first method of impregnation using a dry technique, as shown in FIG. 4, the loaded powder 1 is spread by dusting onto the reinforcement 35. It is possible to use a known dusting system.

In a second method of impregnation by a wet technique, as shown in FIG. 5, the loaded powder 1 is dispersed in a bath 45. The reinforcement 35 passes through the bath 45 so that the loaded powder becomes deposited on the reinforcement 35.

Whatever the impregnation technique used, the reinforcement and the loaded powder then pass through an oven 40 that applies a predetermined heating cycle.

For example, the heating cycle comprises a first stage of temperature rising at a gradient of 50° C./min up to a maximum temperature of 330° C., followed by a second stage of maintaining said maximum temperature for a duration lying in the range 15 min to 30 min, e.g. 20 min.

At the end of this operation, a product 50 is obtained. This electrically conductive product 50 is made of composite materials having reinforcement impregnated by the cores and the filaments of the loaded powder.

Figure 6:
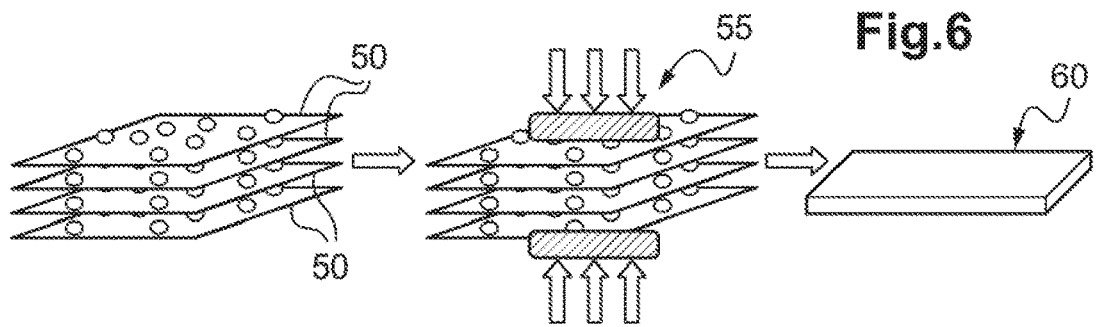

With reference to FIG. 6, product 50 of this type can be stacked and then placed in a compacting press 55 in order to obtain a laminate 60 made of composite materials.

Furthermore, and independently of the variant, the various dispersion operations mentioned may be performed using ultrasound, e.g. with an ultrasound bath, or an ultrasound probe, in particular in order to avoid degrading the filaments.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of fabricating an electrically conductive powder of thermoplastic polymers, the electrically conductive powder of thermoplastic polymers being referred to as a loaded powder, wherein the method comprises the steps of:
    making an original powder containing cores of thermoplastic polymers, each of the cores comprising a grain or a flake; and
    making the loaded powder using the original powder together with electrically conductive submicrometer filaments and wax so as to form a plurality of particulate compounds, a smallest dimension of each submicrometer filament being less than one micrometer and greater than or equal to one hundred nanometers, each particulate compound comprising at least one of the cores together with at least one of the filaments and a protective membrane of the wax, each articulate compound having at least one of the filaments and one of the protective membranes arranged around one of the cores.

2. The method according to claim 1, wherein each filament is inscribed in a rectangular parallelepiped having a length lying in the range 50 µm to 200 µm, a height lying in the range 100 nm to 400 nm, and a width lying in the range 100 nm to 400 nm.

3. The method according to claim 1, wherein each of the cores is inscribed in a cube presenting sides each extending over a length lying in the range 20 µm to 100 µm.

4. The method according to claim 1, wherein the cores of thermoplastic polymers belong to a family selected from: polyaryletherketone (PAEK); poly(phenylene sulfide) (PPS); polyetherimide (PEI); or polyimide (PI).

5. The method according to claim 1, wherein the filaments are made of silver.

6. The method according to claim 1, wherein the wax is ethyl cellulose.

7. The method according to claim 1, wherein the particulate compounds have a mean percentage by weight of filaments relative to the weight of the cores lying in the range 10% to 30%.

8. The method according to claim 1, wherein the particulate compounds are formed by performing the following steps:

fabricating an intermediate solution, the intermediate solution comprising a solution of a solvent and of the wax in which at least the filaments are dispersed; and spraying the intermediate solution into a reactor.

9. The method according to claim 8, wherein the reactor is an air-fluidized bed reactor, and the method includes a step of fluidizing the original powder in the air-fluidized bed reactor, the spraying being performed by spraying the intermediate solution onto the original powder in the air-fluidized bed reactor.

10. The method according to claim 9, wherein the solvent comprises ethanol.

11. The method according to claim 8, wherein the reactor is an atomizer, the intermediate solution includes the original powder, and the spraying is performed in the atomizer using a fluid presenting a predetermined temperature higher than an evaporation temperature of the solvent.

12. The method according to claim 11, wherein the solvent is water.

13. The method according to claim 11, wherein the predetermined temperature is higher than a glass transition temperature of the wax.

14. A fabrication method for fabricating a product made of composite materials, the product being electrically conductive, wherein the method comprises the steps of:

depositing a loaded powder on reinforcement using a dry technique or a wet technique, making use of the loaded powder obtained by applying the method according to claim 1; and passing the reinforcement and the loaded powder through an oven, which oven applies a predetermined heating cycle.

15. The fabrication method according to claim 14, wherein the heating cycle comprises:

a first stage of temperature rising at a gradient of 50° C./min up to a maximum temperature of 330° C.; and a second stage of maintaining the maximum temperature for a duration lying in the range 15 min to 30 min.

16. A method of fabricating an electrically conductive powder of thermoplastic polymers, the electrically conductive powder of thermoplastic polymers being referred to as a loaded powder, wherein the method comprises:

making an original powder containing cores of thermoplastic polymers, each of the cores comprising a grain or a flake; and combining the original powder with electrically conductive submicrometer filaments and wax to form a plurality of particulate compounds to form the loaded powder, a smallest dimension of each submicrometer filament being less than one micrometer and greater than or equal to one hundred nanometers, each particulate compound comprising at least one of the cores together with at least one of the filaments and a protective membrane of the wax, each particulate compound having at least one of the filaments and one of the protective membranes arranged around one of the cores.

17. The method according to claim 16, wherein each filament is inscribed in a rectangular parallelepiped having a length lying in the range 50 μm to 200 μm, a height lying in the range 100 nm to 400 nm, and a width lying in the range 100 nm to 400 nm.

18. The method according to claim 16, wherein each of the cores is inscribed in a cube presenting sides each extending over a length lying in the range 20 μm to 100 μm.

19. The method according to claim 16, wherein the cores of thermoplastic polymers belong to a family selected from: polyaryletherketone (PAEK); poly(phenylene sulfide) (PPS); polyetherimide (PEI); or polyimide (PI), the filaments are made of silver, and the wax is ethyl cellulose.

20. The method according to claim 16, wherein the particulate compounds have a mean percentage by weight of filaments relative to the weight of the cores lying in the range 10% to 30%.

* * * * *